March 4, 1958 G. W. JONES 2,825,772
TIMER
Filed Feb. 29, 1956 2 Sheets-Sheet 1

Inventor
Gerald W. Jones
by James L. Nettleto
Attorney

March 4, 1958  G. W. JONES  2,825,772
TIMER
Filed Feb. 29, 1956  2 Sheets-Sheet 2
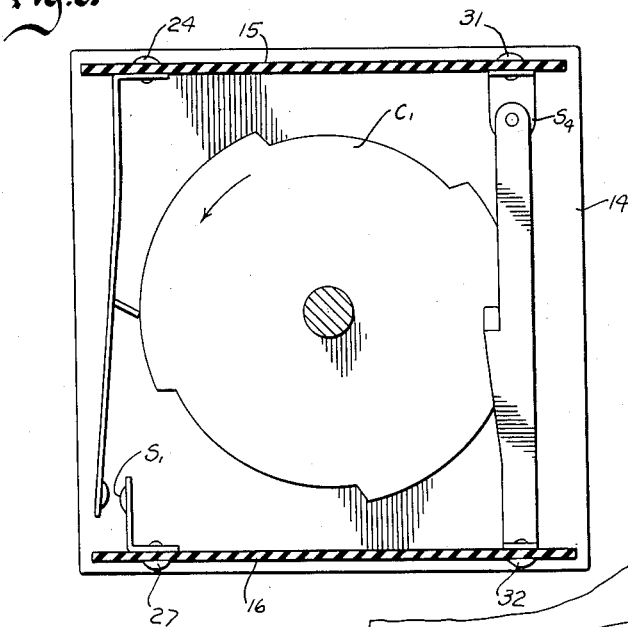
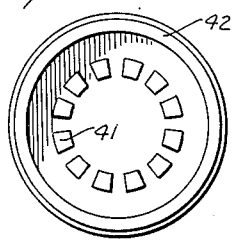
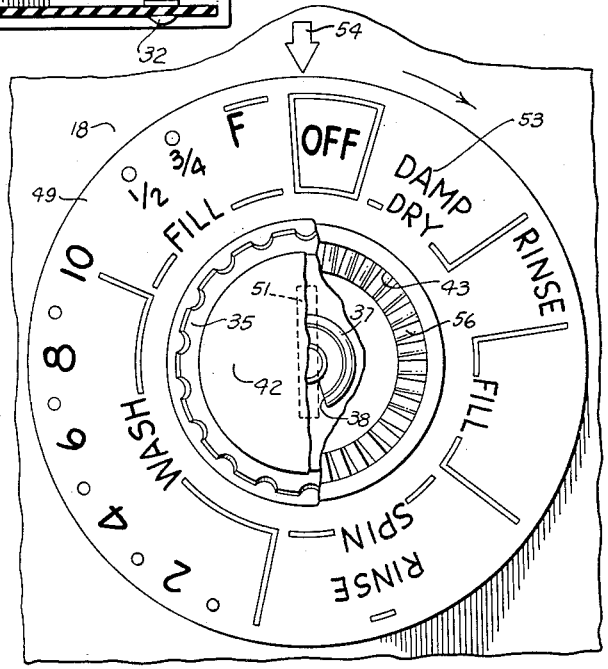
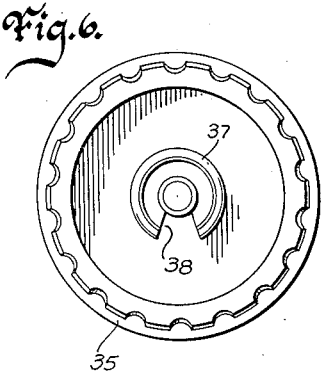
Inventor
Gerald W. Jones
by James S. Nettles
Attorney United States Patent Office 2,825,772
Patented Mar. 4, 1958

2,825,772

TIMER

Gerald W. Jones, Newton, Iowa, assignor to The Maytag Company, Newton, Iowa, a corporation of Delaware Application February 29, 1956, Serial No. 568,495

9 Claims. (Cl. 200—37)

This invention relates to an electric timer designed to control one or more electric circuits throughout a programmed sequence. It pertains specifically to an improvement in a timer control mechanism which may be manually adjusted by rotation of the timer control knob only after the timer control knob itself has been shifted axially to open a master switch and to effect a deenergization of the circuits controlled by that timer mechanism.

In the control of certain electrically operated appliances such as automatic washing machines, it is now common to utilize an electric timer to regulate the programmed energization of certain electrical components controlling the machine once the timer itself has been preset and energized. Some of these timer mechanisms for automatic washing machines may be energized for a relatively lengthy period of time taking a half-hour or longer to slowly rotate the timer cams throughout the operational cycle of the controlled machine. These timer mechanisms are usually provided with a control knob permitting a manual rotation of the timer cams independently of the timer drive without requiring a deenergization of the various controlled circuits. Since the timer control knob is usually directly connected to the timer rotor carrying the timer cams, the rotation of the timer control knob permits an operator of the machine to energize these various circuits in a very short period of time by the practically instantaneous setting motion which may be imparted to the timer control knob. While such an acceleration of the energization of these various circuits may not be objectionable under some circumstances, it may be undesirable when the inertia of the various energized circuit components is considered.

When this problem of inertia is considered, it may be found that an accelerated energization of certain circuits may result in the inertia of a circuit component either working against other circuits controlled by the timer mechanism or causing the controlled circuit component to operate incorrectly.

Such a case might arise where a reversible motor is energized successively in two different directions to perform two separate and successive functions such as the wash and spin rinse operations performed in automatic washing machines. When a reversible motor is used to perform these two consecutive functions in an automatic washing machine, the timing mechanism of the washing machine deenergizes the reversible motor following the performance of the washing function and normally allows the motor to come to a complete stop during a brief interval of possibly a half minute before reenergizing the motor for the performance of the spinning function.

Now, assuming the use of a split-phase or capacitor start single-phase fractional horsepower motor in a washing machine, if the operator turns the timer knob slowly through the wash or first period in which the motor is energized in one direction and then turns the timer knob into the spin rinse or second period in which the start winding is reversed to reverse the motor, the motor may have time to decelerate sufficiently and go into its start winding in which case the motor would be reversed at the expense of possible overheating of the motor. On the other hand, if the timer knob is rotated quickly through the first wash period and into the second spin period, the motor may never get back into its starting winding in which case its inertia would carry it through the instant current interruption and would cause the motor to rotate in the same direction in both periods of operation which, under the conditions set forth in this illustrative example, would be objectionable.

My invention is directed toward a timer control mechanism to prevent such occurrences. In my invention a timer rotor carrying a number of peripheral cams is driven by a constant speed motor to control a series of switches actuated by the peripheral cams. The timer rotor is axially shiftable into either of two positions to open or to close a master switch actuated by the rear face of one of the cams and which controls the energization of the circuits sequentially energized by the peripheral cams. If desired, this master switch may also be used to control the energization of the timer motor itself.

A timer dial indicating the stage of operations performed by the apparatus controlled by the timer is keyed to the rotor shaft while the timer control knob for setting the timer mechanism is rotatably mounted and axially restrained on that same rotor shaft. The timer dial and the timer control knob carry opposing clutch surfaces which are normally separated by a compression spring during the energization of the timer so that the timer control knob may be freely rotated without changing the angular position of the peripheral cams. However, when the timer control knob and the timer rotor are axially shifted toward the timer dial and into a second position to overcome the bias of the compression spring, the movement of the timer rotor opens the master switch to deenergize the controlled circuits while the clutch surfaces of the timer dial and the timer knob snap into engagement so that the cams may be manually rotated and reset to any desirable position.

Referring now to the accompanying drawings:

Figure 3 is a cross sectional view taken on line 3—3 of Figure 1;

Figure 5 is a plan view of the timer knob and dial structure, partially broken away to show the details of clutch facing on the timer dial;

Figure 6 is a plan view of the timer knob structure with a knob retainer cap removed; and Figure 7 is a plan view of the interior of the knob retainer cap.

Figure 1:
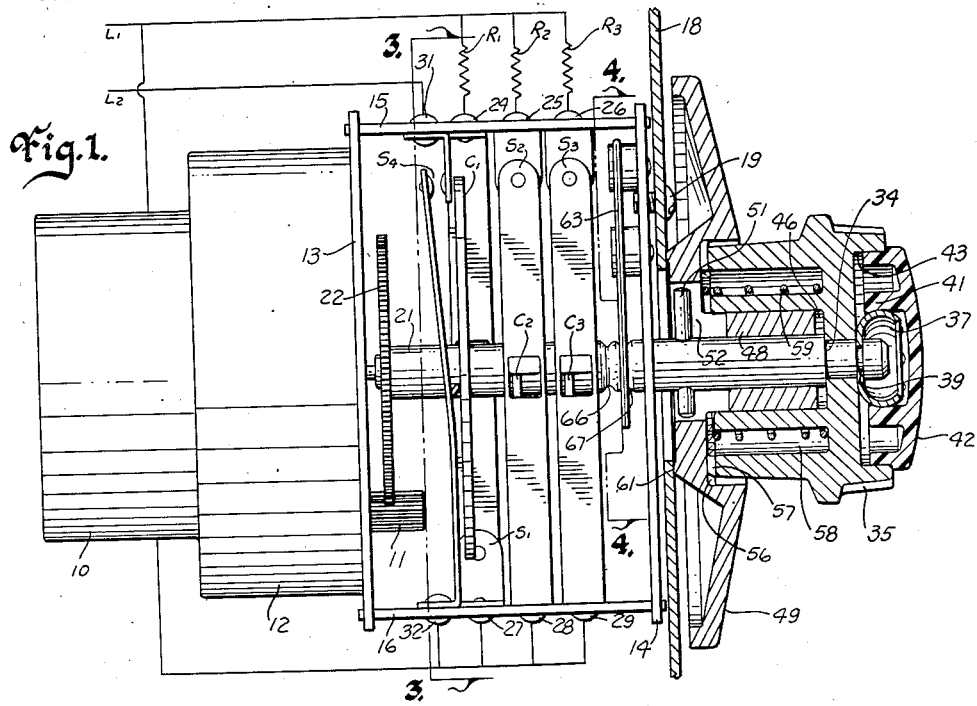
Figure 1 represents a longitudinal cross sectional view of a timer mechanism incorporating my invention and showing the timer mechanism in a deenergized and adjustable position.

Referring now to the accompanying drawings in detail, my timer mechanism is powered by constant speed motor 10 which drives the drive pinion 11 through the reduction gearing enclosed by housing 12. Housing 12 is mounted upon the rear timer housing plate 13 which cooperates with the front timer housing plate 14 to support the insulated upper and lower terminal boards 15 and 16, respectively, to form a unitary timer housing which is mounted upon the cabinet panel 18 of the apparatus to be controlled by means of the machine screws 19 one of which is illustrated.

Journalled in the front and rear timer plates 14 and 13, respectively, is the timer rotor shaft 21 which is driven by pinion 11 through gear 22 affixed at the left or rear end of shafts 21.

Also fixed to the timer rotor shaft 21 are the three timer cams $C_1$, $C_2$ and $C_3$ whose respective illustratively contoured peripheries actuate the three circuit switches $S_1$, $S_2$ and $S_3$. These circuit switches are respectively provided with the terminal contacts 24, 25, and 26 on the upper terminal board 15 and with the terminal contacts 27, 28 and 29 respectively placed on the lower terminal board 16. While each of the switches $S_1$, $S_2$ and $S_3$ is of conventional construction in that in each of these switches a cam follower of spring stock is connected to one of the insulated boards and is constantly urged towards the rotational axis of the timer shaft 21 to make contact with a stationary contact carried by the terminal connection on the opposite terminal board whenever the dwell of the respective cam permits such a contact to be made, switch $S_1$ is 180° removed from switches $S_2$ and $S_3$ in this construction in order to show more clearly the details of the master switch $S_4$. While it should be apparent that the number of circuit switches may be either greater or fewer in number than that illustrated in this embodiment, only three circuit switches have been shown in the accompanying drawings.

Master switch $S_4$ is of similar construction to switches $S_1$, $S_2$ and $S_3$ in that it is of a similar spring stock construction to these latter switches. Switch $S_4$ has a contact 31 on the upper terminal board 15 and a contact 32 on the lower terminal board 16 providing connections to that switch. However, unlike the other switches, switch $S_4$ is unaffected by the rotation or periphery of any of the timer cams. Its actuation is determined solely by the axial positioning of cam shaft 21 as movement of that shaft causes a shifting of cam $C_1$ whose rear face resists the closing of switch $S_4$ when shaft 21 is in position shown in Figure 1. It should be apparent from this function of shaft 21 that a separate insulated actuator on shaft 21 could be used to actuate switch $S_4$ in place of cam $C_1$. Movement of timer shaft 21 into the position shown in Figure 2 allows master switch $S_4$ to close and to complete contact between its terminals 31 and 32.

Figure 2:
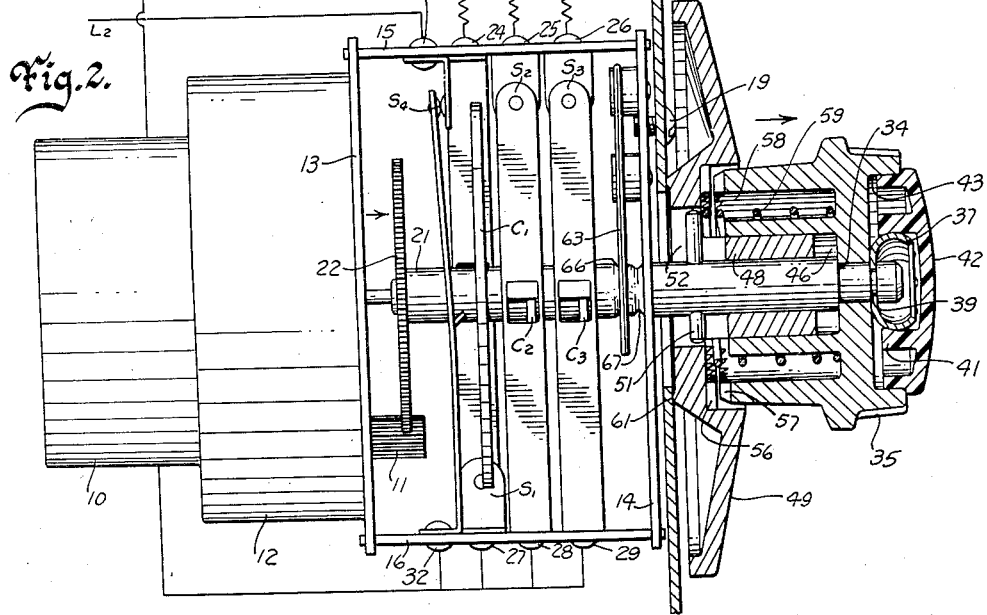
Figure 2 is a cross sectional view similar to that of Figure 1 showing the timer control mechanism in its energized position.
Figure 4:
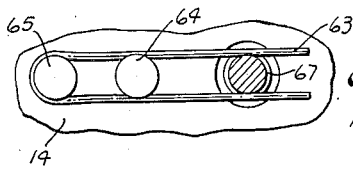
Figure 4 is a view taken on line 4—4 of Figure 1 showing the details of the detent controlling the axial positioning of the timer rotor.

In order to show the cooperation achieved between master switch $S_4$ and its circuit switches $S_1$, $S_2$ and $S_3$, my timer mechanism has been shown in Figures 1 and 2 in connection with a simplified illustrative electrical wiring diagram. From this diagram it will be apparent that of the two conductors $L_1$ and $L_2$ supplying the source of electrical potential to my timer control mechanism, line $L_1$ connects directly to load resistances $R_1$, $R_2$ and $R_3$ representing the various circuit components to be controlled by my timer mechanism before leading to the terminals 24, 25 and 26, respectively, on the upper terminal board 15.

These circuit load resistances $R_1$, $R_2$ and $R_3$ are shown connected in parallel with each other through their respective switches $S_1$, $S_2$ and $S_3$ which are in turn respectively provided with terminals 27, 28 and 29 on the lower terminal board 16. Terminals 27, 28 and 29 are connected to contact 32 which in turn leads through the master switch $S_4$ and the upper terminal 31 back to line $L_2$ to complete the circuit.

Timer motor 10 is connected between line $L_1$ and contact 32 on terminal board 16 so as to be controlled by master switch $S_4$ also. It will be understood that these connections are illustrative of one particular use of my timer control mechanism and are not intended to limit its use to only such a circuit in any way.

In the illustrated circuit it should be apparent that cams $C_1$, $C_2$ and $C_3$ will actuate the respective switches $S_1$, $S_2$ and $S_3$ over the programmed cycle determined by the respective cam peripheries so long as master switch $S_4$ is closed as shown in Figure 2. The shifting movement necessary to open and close master switch $S_4$ is achieved by the shifting of timer control shaft 21 which is provided at its right or front end with a reduced diameter defining a shoulder 34 abutting the timer control knob 35 freely revoluble on shaft 21. Control knob 35 is retained on the front end of shaft 21 by the cup-shaped retaining washer 37 whose slot 38 slides onto the annular groove 39 at the outer end of shaft 21. Retaining washer 37 is centered on shaft 21 by means of a ring of prongs 41 projecting from the rear surface of knob cap 42 whose outer periphery is securely fitted into a cylindrical recess 43 provided at the outer end of the timer control knob 35.

Timer control knob 35 is also counterbored at 46 to receive the hub portion 48 of the timer dial member 49 which is axially slidable on but not revoluble relative to timer shaft 21. Although timer dial 48 may be keyed or splined to shaft 21 by equivalent connections to permit axial movement between these parts while restraining relative rotation therebetween, this function is achieved in this particular embodiment by means of a pin and slot connection.

Shaft 21 is pierced by a fixed cross pin 51 one end of which projects farther from shaft 21 than the other. Timer dial 49 in turn is provided with a mating slot 52 to accommodate this cross pin 51 in one position only. In this way the pin and slot connection between timer dial 49 and shaft 21 not only permits axial movement between these members but also indexes the timer dial nomenclature generally indicated at 53 with respect to the cams $C_1$, $C_2$ and $C_3$ so that the nomenclature appearing opposite the cabinet panel reference arrow 54 will always correctly designate the function being performed by the apparatus controlled by the timer mechanism.

As indicated by the directional arrow in Figure 5 timer dial 49 rotates in a clockwise direction as motor 10 turns timer shaft 21. While the actual circuitry of the washing machine utilizing the illustrated timer dial is not shown and is not necessary for an understanding of the use of this invention, it will be apparent from indicia 53 that after timer dial 49 is rotated clockwise to start the operation of the machine, it progresses past reference arrow 54 into the fill period, the wash period, the spin rinse period, the second fill period, the second rinse period and finally into the damp dry period before the washing machine operation is terminated in the off position.

As previously set forth in the discussion of objects of this invention, the wash and spin rinse periods are separated by a half minute break, indicated on the timer dial 49 only by the break in the timer dial arcuate line separating these periods, to allow certain energized components, represented by the illustrated components $R_1$, $R_2$ and $R_3$ and in actual practice possibly including a reversible motor, to come to a complete stop following the end of the wash period before the spin rinse period is commenced. From this it will be appreciated that a quick manual twist of dial 49 and shaft 21 from the wash period into the spin rinse period would frustrate the purpose of this short delay period. The object of this invention, therefore, is not only to effect a deenergization of the circuit components $R_1$, $R_2$ and $R_3$ by opening master switch $S_4$ before a manual rotation of the control cams is made possible but also to make it mandatory that the operator consume a certain minimum time in deenergizing these circuit components and resetting the control cams $C_1$, $C_2$ and $C_3$ before the circuit components are again energized. While this admittedly may take less than the half minute interval provided on the timer, the delay achieved in the resetting of timer dial 49 has been found to be sufficient to allow a reversible motor to stop and reverse its direction. It should be also noted here that in actual practice the timer drive incorporated in this invention was a step timer having minimum intervals of half minute steps thus accounting for the minimal half minute period.

Since the timer control knob 35 is revolubly mounted on the timer control shaft 21, any rotational movement imparted to timer control knob 35 must be transmitted through the timer dial 49 and the pin and slot connection on that shaft before any rotational movement will be imparted to the control cams $C_1$, $C_2$ and $C_3$. To accomplish this function, timer dial 49 is provided with a ring of clutch teeth 56 which may engage with mating teeth 57 formed on the rear end of timer control knob 35.

While the configuration of the clutch teeth may take several different forms, the saw tooth construction indicated in Figure 5 is preferred for two reasons. First, this construction permits rotary motion to be imparted to the timer dial plate 49 through the timer control knob 35 in a clockwise direction but allows the teeth 56 and 57 to ratchet with respect to each other whenever timer control knob 35 is turned in a counterclockwise direction. Secondly, whereas clutch teeth of square tooth design would tend to abut each other rather than engaging each other properly, the saw tooth construction will prevent any abutting of the clutch teeth and will provide a more positive engagement of these teeth whenever knob 35 is shifted laterally toward timer dial 49.

Since it is desired to keep clutch teeth 56 and 57 disengaged during normal operation of the timer mechanism, it will be seen that the timer control knob 35 is provided with a cylindrical recess 58 which houses a compression spring 59 reacting on the base of recess 58 and bearing at its opposite end on the central portion of timer dial 49 to disengage teeth 56 and 57 and to assure that the timer dial 49 is constantly urged against the cabinet panel 18 mounting this complete timer assembly. Figure 2 indicates this disengaged position of clutch teeth 56 and 57. It will be noted that the timer dial 49 is molded with a slightly protruding nose ring 61 to provide a line contact rather than an area contact between dial 49 and the panel member 18 to reduce the frictional drag between these members while dial 49 is rotating relative to panel 18.

From the position in Figure 2 in which the master switch $S_4$ is closed to energize the timer motor 10 and to condition the circuit components $R_1$, $R_2$ and $R_3$ for operation by the switches $S_1$, $S_2$ and $S_3$ when actuated by the rotating cams $C_1$, $C_2$ and $C_3$, timer knob 35 may be shifted axially toward panel 18 to place the timer mechanism in the position shown in Figure 1. However, movement of shaft 21 into or out of either of the positions shown in Figure 1 or Figure 2 is resisted by the cooperation of a U-shaped spring detent member 63, anchored on abutments 64 and 65 carried by the front timer plate 14, with the annular notches 66 and 67 formed in shaft 21.

In Figure 2, shaft 21 is shown moved to the right to separate timer control knob 35 from timer dial 49 so that spring detent member 63 engages the left annular notch 66. In this position it will be seen that timer motor 10 is energized through the master switch $S_4$ and turns timer shaft 21 through gears 11 and 22 to actuate switches $S_1$, $S_2$ and $S_3$ independently of the control knob 35 which free wheels on shaft 21. As long as the spring detent member 63 remains in the left annular notch 66, no rotational movement imparted to the timer control knob 35 will be transmitted to either the timer dial 49 or the timer control shaft 21.

To change the annular setting of the control cams $C_1$, $C_2$ and $C_3$ manually, it is first necessary to push the timer control knob 35 inwardly against shoulder 34 of shaft 21 to effect a similar inward movement of shaft 21 with respect to the control panel 18 and the timer housing. Due to the width of drive pinion 11 and the cam followers forming the switches $S_1$, $S_2$ and $S_3$, neither the driving connection between gears 11 and 22 nor the positioning of these control switches will be affected by this axial movement of shaft 21. Inward movement of shaft 21, however, does open master switch $S_4$ and moves shaft 21 relative to detent 63 causing the resilient arm of detent 63 to expand to accommodate the normal shaft diameter of shaft 21 before slipping back into the right notch 67 with a snap action to maintain the timer control shaft 21 in its new position.

Inward movement of timer control knob 35 is resisted but is not prevented by the compression spring 59 which exerts a smaller separating force between knob 35 and timer dial 49 than does the restraining detent 63 once knob 35 has been pushed into the position shown in Figure 1. Consequently, the inward force exerted by shaft 21 on knob 35 through the retaining washer 37 overcomes the bias of spring 59 and maintains the clutch teeth 56 and 57 engaged in this position to permit rotational movement to be imparted to cams $C_1$, $C_2$ and $C_3$ without causing any rapid energization or deenergization of the circuit components $R_1$, $R_2$ or $R_3$ which have been totally deenergized by the opening of the master switch $S_4$.

Once the control knob 35 and the control cams $C_1$, $C_2$ and $C_3$ have been rotated to position the desired indicia 53 opposite the reference arrow 54, knob 35 may again be pulled out against washer 37 to shift shaft 21 outwardly to close master switch $S_4$, to move detent 63 into the left notch 66 and to separate clutch teeth 56 and 57 of timer dial 49 and timer knob 35 respectively. This will again place control of the control cams and circuit components under the control of timer motor 10 which will rotate timer control shaft 21 independently of the timer control knob 35.

I claim:

1. Control mechanism comprising, a frame, a revoluble shaft axially slideable in said frame between first and second setting positions, means limiting the permanent axial positioning of said shaft to either of said first or second setting positions, a first clutch member mounted on said shaft and restrained against rotation relative to said shaft, a second clutch member freely revoluble on said shaft and restrained against axial movement relative thereto, bias means separating said clutch members when said shaft is in said first setting position, said shaft being moveable into said second setting position to engage said clutch members against the action of said bias means.

2. Control mechanism comprising, a frame, a revoluble shaft axially slideable in said frame between first and second setting positions, means limiting the permanent axial positioning of said shaft to either of said first or second setting positions, a first clutch member mounted on said shaft and restrained against rotation relative to said shaft, a manually operable clutch member freely revoluble on said shaft and restrained against axial movement relative thereto, bias means separating said clutch members when said shaft is in said first setting position, said shaft being moveable into said second setting position by axial movement of said manually operable clutch member to engage said clutch members against the action of said bias means.

3. Control mechanism comprising, a frame, a revoluble shaft axially moveable in said frame between first and second setting positions, a cam fixed to said shaft, a switch controlled by rotation of said cam, means limiting the permanent axial positioning of said shaft to either of said first or second setting positions, a first clutch member mounted on said shaft and restrained against rotation relative to said shaft, a manually operable clutch member freely revoluble on said shaft and restrained against axial movement relative thereto, bias means separating said clutch members when said shaft is in said first setting position, said shaft being movable into said second setting position by axial movement of said manually operable clutch member against the action of said bias means to engage said clutch members for the transmission of rotary movement to said shaft from said manually operable clutch member.

4. Control mechanism comprising, a frame, a revoluble shaft axially moveable in said frame between first and second setting positions, a cam fixed to said shaft, a first switch controlled by rotary movement of said cam, a second switch controlled by axial movement of said shaft, means limiting the permanent positioning of said shaft to either of said first or second setting positions, said second switch being moved into a closed position by said shaft when said shaft is in said first setting position and being moved into an open position when said shaft is in said second setting position, a first clutch member carried on said shaft and restrained against rotation relative to said shaft, a manually operable clutch member freely revoluble on said shaft and restrained against axial movement relative thereto, bias means separating said clutch members when said shaft is in said first setting position, said shaft being moveable into said second setting position by axial movement of said manually operable clutch member to open said second switch and engage said clutch members for the transmission of rotary movement from said manually operable clutch member to said shaft.

5. Control mechanism comprising, a control circuit, a frame, a revoluble shaft axially moveable in said frame between first and second setting positions, a cam fixed to said shaft, a first switch in said circuit and actuated by rotation of said cam for regulating the sequential actuation of said circuit, a second switch in said circuit and actuated by axial movement of said shaft and controlling the energization of said circuit, means limiting the permanent positioning of said shaft to either of said first or second setting positions, said second switch being in a closed position when said shaft is in said first setting position and being in an open position when said shaft is in said second setting position, a first clutch member carried on said shaft and restrained against rotation relative to said shaft, a manually operable clutch member freely revoluble on said shaft and restrained against axial movement relative thereto, bias means separating said clutch members when said shaft is in said first setting position, said shaft being moveable into said second setting position by axial movement of said manually operable clutch member to open said second switch to deenergize said circuit and to engage said clutch members for the transmission of rotary setting movements from said manually operable clutch member to said shaft.

6. Control mechanism comprising, a frame, a revoluble shaft axially moveable in said frame between first and second setting positions, means restraining the stabilized axial positioning of said shaft to either of said setting positions, drive means for rotating said shaft, a cam fixed to said shaft, a first switch controlled by rotational movement of said cam, a second switch controlled by axial movement of said shaft between said first and second setting positions, a first clutch member slideably mounted on said shaft and restrained against rotation relative thereto, a manually operable clutch member freely revoluble on said shaft and restrained against axial movement relative thereto, bias means positioned between said clutch members and constantly urging said first clutch member toward said frame and away from said manually operable clutch member, said shaft being moveable into said second setting position by axial movement of said manually operable clutch member to actuate said second switch and engage said clutch members for the transmission of rotary movement from said manually operable clutch member to said shaft.

7. Control mechanism comprising, a frame, a revoluble shaft axially moveable in said frame between first and second setting positions, means restraining the stabilized axial positioning of said shaft to either of said setting positions, drive means for rotating said shaft, a cam fixed to said shaft, a first switch controlled by rotational movement of said cam, a second switch controlled by axial movement of said shaft between said first and second setting positions, a cross pin fixed to said shaft, a dial member mounted on said shaft and having a mating slot cooperating with said cross pin for indexing said dial on said shaft, a manually operable control knob freely revoluble on said shaft and restrained against axial movement relative thereto, cooperating clutch teeth on said dial member and said control knob, bias means positioned between said dial member and said control knob urging said dial member away from said control knob and toward said frame, said shaft being moveable into said second setting position by axial movement of said knob against the action of said bias means to actuate said second switch and engage said clutch teeth for the transmission of rotary motion from said knob to said shaft.

8. Control mechanism comprising, a frame, a revoluble shaft axially moveable in said frame between first and second setting positions, means restraining the stabilized axial positioning of said shaft to either of said setting positions, drive means for rotating said shaft, a cam fixed to said shaft, a first switch controlled by rotational movement of said cam, a second switch controlled by axial movement of said shaft between said first and second setting positions, a cross pin fixed to said shaft, a dial member having a mating slot cooperating with said cross pin for indexing said dial on said shaft, a manually operable control knob freely revoluble on said shaft, said shaft being provided with a shoulder abutting said knob and limiting relative axial movement in one direction between said knob and said shaft, said shaft being further provided with an annular groove, a retaining member engaging said groove and limiting relative axial movement in the opposite direction between said knob and said shaft, a knob cap engaging said control knob and centering said retaining member on said shaft, cooperating clutch teeth of saw-tooth configuration on said dial member and said control knob, bias means positioned between said dial member and said control knob urging said dial member away from said control knob and toward said frame, said shaft being moveable into said second setting position by axial movement of said knob against the action of said bias means to actuate said second switch and engage said clutch teeth for the transmission of rotary motion from said knob to said shaft.

9. Control mechanism comprising, a frame, a revoluble shaft axially movable in said frame between first and second setting positions, means restraining the stabilized axial positioning of said shaft to either of said setting positions, drive means for rotating said shaft, a cam fixed to said shaft, a first switch controlled by rotational movement of said cam, a second switch controlled by axial movement of said cam between said first and second setting positions, a dial member axially slidable on said shaft and restrained against rotation relative to said shaft, a manually operable control knob freely revoluble on said shaft, said shaft being provided with a shoulder abutting said knob and limiting relative axial movement in one direction between said knob and said shaft, said shaft being further provided with an annular groove, a retaining member engaging said groove and limiting relative axial movement in the opposite direction between said knob and said shaft, a knob cap engaging said control knob and centering said retaining member on said shaft, cooperating clutch teeth on said dial member and said control knob, bias means positioned between said dial member and said control knob urging said dial member away from said control knob and toward said frame, said shaft being movable into said second setting position by axial movement of said knob against the action of said bias means to actuate said second switch and engage said clutch teeth for the transmission of rotary motion from said knob to said shaft.

References Cited in the file of this patent
UNITED STATES PATENTS

| | | |
|---|---|---|
| 1,708,619 | Hart | Apr. 9, 1929 |
| 2,302,626 | Gallagher | Nov. 17, 1942 |
| 2,540,723 | Geldhof et al. | Feb. 6, 1951 |